(12) United States Patent
Tsuchiya et al.

(10) Patent No.: US 11,226,484 B2
(45) Date of Patent: Jan. 18, 2022

(54) HEAD-UP DISPLAY DEVICE

(71) Applicant: NIPPON SEIKI CO., LTD., Niigata (JP)

(72) Inventors: Satoshi Tsuchiya, Niigata (JP); Toshiaki Takahashi, Niigata (JP); Jun Suzuki, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 16/340,989

(22) PCT Filed: Oct. 13, 2017

(86) PCT No.: PCT/JP2017/037151
§ 371 (c)(1),
(2) Date: Apr. 10, 2019

(87) PCT Pub. No.: WO2018/079307
PCT Pub. Date: May 3, 2018

(65) Prior Publication Data
US 2019/0293932 A1    Sep. 26, 2019

(51) Int. Cl.
*B60K 35/00* (2006.01)
*G02B 27/01* (2006.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
CPC ............... G02B 27/01; G02B 27/0101; G02B 27/0977; G02B 2027/0118; G03B 21/145;
(Continued)

(56) References Cited

U.S. PATENT DOCUMENTS

2009/0262276 A1*  10/2009  Jeong ................... G02B 6/0085
                                                349/58
2017/0059864 A1*   3/2017  Takahashi .............. B60K 35/00
2017/0315351 A1   11/2017  Yamazoe et al.

FOREIGN PATENT DOCUMENTS

EP    3 220 186 A1    9/2017
JP    2004-338578 A   12/2004
(Continued)

OTHER PUBLICATIONS

International Search Report issued in corresponding International Patent Application No. PCT/JP2017/037151, dated Nov. 7, 2017.

*Primary Examiner* — Temesghen Ghebretinsae
*Assistant Examiner* — Karin Kiyabu
(74) *Attorney, Agent, or Firm* — McDermott Will & Emery LLP

(57) ABSTRACT

Provided is a head-up display device wherein in a state where a light-receiving unit is connected to a control substrate, a lid can be easily mounted to a case. Housed in a case of a head-up display device are a substrate for controlling a projector and a reflection unit for reflecting light projected thereon by the projector. The reflection unit is configured to have a reflecting mirror that is held by a holder, while the substrate is connected, via a connection member, with a light-receiving unit for detecting light from outside. The light-receiving unit is configured to have a light-receiving sensor that is held by a sensor holding part. The sensor holding part for holding the light-receiving sensor is held by the holder.

6 Claims, 3 Drawing Sheets

(51) Int. Cl.
 *G02B 27/09* (2006.01)
 *G03B 21/14* (2006.01)
 *G03B 21/28* (2006.01)

(52) U.S. Cl.
 CPC ....... *G02B 27/0977* (2013.01); *G03B 21/145* (2013.01); *G03B 21/28* (2013.01)

(58) Field of Classification Search
 CPC .. G03B 21/28; B60K 35/00; B60K 2370/334; B60K 2370/336; B60K 2370/349; B60K 2370/52; B60K 2370/1529
 See application file for complete search history.

(56) References Cited

FOREIGN PATENT DOCUMENTS

| | | | | |
|---|---|---|---|---|
| JP | 2004338578 | A | * | 12/2004 |
| JP | 2014085657 | A | * | 5/2014 |
| JP | 2015-071391 | A | | 4/2015 |
| JP | 2015071391 | A | * | 4/2015 |
| JP | 2015-152746 | A | | 8/2015 |
| JP | 2016-103008 | A | | 6/2016 |

* cited by examiner

HEAD-UP DISPLAY DEVICE

CROSS REFERENCE

This application is the U.S. National Phase under 35 U.S.C. § 371 of International Application No. PCT/JP2017/037151, filed on Oct. 13, 2017, which claims the benefit of Japanese Application No. 2016-209790, filed on Oct. 26, 2016, the entire contents of each are hereby incorporated by reference.

TECHNICAL FIELD

The present invention relates to a head-up display device including a light-receiving unit which detects light from the outside (external light).

BACKGROUND ART

A device which displays various kinds of information on a windshield or the like of a vehicle, and allows the displayed information to be visually recognized together with the surrounding background, i.e., the so-called head-up display device, is known. A part of the head-up display device includes a light-receiving unit. Illuminance of external light is detected by the light-receiving unit, and the brightness of the image to be displayed is adjusted according to the illuminance of the external light. Visibility can thereby be improved. For example, as a conventional technique related to a head-up display device, a technique disclosed in Patent Literature 1 is known.

A head-up display device disclosed in Patent Literature 1 is structured such that a projector, which projects light for displaying an image, a reflection unit, which reflects the light projected from the projector, and a light-receiving unit, which detects light from the outside, are accommodated in a case and a lid body placed over the case. The light-receiving unit includes a sensor substrate on which a light-receiving sensor is mounted. The sensor substrate is connected to a control board via a connecting member.

Meanwhile, fitting of the lid body to the case is performed in such a state that the control board and the sensor substrate are connected to each other via the connecting member. The control board is accommodated in the case. In contrast, the sensor substrate is mounted on the lid body.

In other words, fitting of the lid body is carried out in such a state that the lid body is connected to the case by the connecting member. Accordingly, a range in which the lid body can be moved is restricted. If the length of the connecting member is increased, the range in which the lid body can be moved is increased. However, the connecting member may be caught between the case and the lid body when the lid body is placed over the case. Meanwhile, if the length of the connecting member is reduced, the range in which the lid body can be moved is further reduced. It is preferable that the lid body be easily fit to the case while the light-receiving unit is being connected to the control board.

PRIOR ART DOCUMENT

Patent Document

Japanese Unexamined Patent Application Publication No. 2015-71391

SUMMARY OF THE INVENTION

Problems to be Solved by the Invention

An object of the present invention is to provide a head-up display device in which a lid body can be easily fit to a case while a light-receiving unit is being connected to a control board.

Solution to Problem

According to the invention of claim 1, there is provided a head-up display device including: a case accommodating therein a projector which projects light for displaying an image, a substrate which controls the projector, a reflection unit which reflects the light projected from the projector, and a light-shielding body which blocks light from the outside; and a lid body covering an upper part of the case, in which
the reflection unit is configured to hold a reflecting mirror by a holder,
a light-receiving unit which detects the light from the outside is connected to the substrate via a connecting member, and
the light-receiving unit is configured to hold a light-receiving sensor by a sensor holding portion, characterized in that
the sensor holding portion is held by the holder.

As recited in claim 2, preferably, the sensor holding portion is provided with a cylindrical portion which surrounds the light-receiving sensor cylindrically.

As recited in claim 3, preferably, the holder is integrally formed with the light-shielding body.

As recited in claim 4, preferably, the sensor holding portion is integrally formed with the holder.

Effect of the Invention

In the invention recited in claim 1, the light-receiving unit which detects light from the outside is structured such that the light-receiving sensor is held by the sensor holding portion, and the sensor holding portion is held by the holder which holds the reflecting mirror of the reflection unit. The holder and the substrate which controls the projector are both accommodated in the case, and the substrate and the light-receiving sensor are connected to each other by the connecting member. Thus, the connecting member is accommodated in the case, and is not connected to the lid body. As a result, when the lid body is fit to the case, movement of the lid body is not restricted by the connecting member. Fitting of the lid body is facilitated.

In the invention recited in claim 2, the sensor holding portion is provided with a cylindrical portion which surrounds the light-receiving sensor cylindrically. The light-receiving sensor is protected by the cylindrical portion. Given that the cylindrical portion is provided on the lid body, in a state where the lid body is placed over the case, there is a possibility that the center of the light-receiving sensor provided on the case side will be deviated from the center of the cylinder provided on the lid body side due to a dimension error of the components. If the centers of the two are deviated from each other, the detection accuracy of the light-receiving sensor may be lowered. Meanwhile, when the cylindrical portion is provided on the sensor holding portion, in other words, when the sensor holding portion and the cylindrical portion are both provided on the case side, there is no fear of deviation between the center of the cylindrical portion and the center of the light-receiving sensor held by the sensor holding portion. Therefore, the detection accuracy of the light-receiving sensor can be maintained.

In the invention recited in claim 3, the holder is integrally formed with the light-shielding body. Accordingly, a component for attaching the holder of the reflecting mirror to the case is not required. As a result, the number of components constituting the head-up display device can be reduced.

In the invention recited in claim 4, the sensor holding portion is integrally formed with the holder. Accordingly, a component for attaching the sensor holding portion to the holder of the reflecting mirror is not required. As a result, the number of components constituting the head-up display device can be reduced.

MODE FOR CARRYING OUT THE INVENTION

An embodiment of the present invention will be described with reference to the accompanying drawings. In the following description, right and left refer to the right and the left with reference to a vehicle occupant, and front and rear refer to the front and the rear with reference to a traveling direction of the vehicle. In the figure, Fr represents front, Rr represents rear, L represents left as seen from the occupant, R represents right as seen from the occupant, Up represents up, and Dn represents down.

Embodiment

Figure 1:
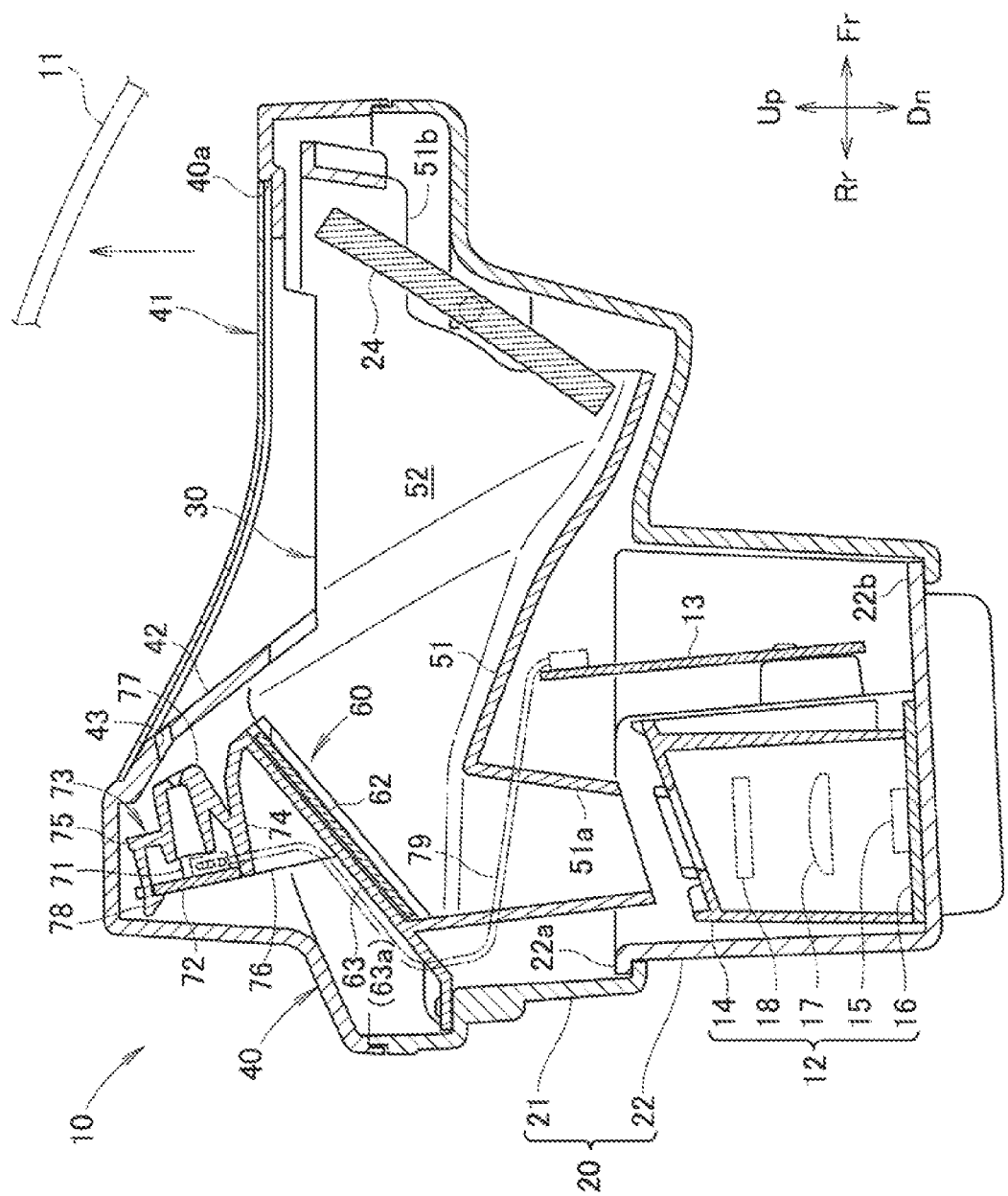
FIG. 1 is a cross-sectional view of a head-up display device according to an embodiment of the present invention.

FIG. 1 is referred to. FIG. 1 illustrates a head-up display device 10 according to an embodiment of the present invention. The head-up display device 10 is, for example, mounted on a vehicle.

Light projected from the head-up display device 10 is displayed as an image on a windshield 11 (screen 11), and a driver can visually recognize the image together with a background ahead of the windshield 11. Items of vehicle information such as speed, and navigation information, etc., are displayed as the image, for example.

The head-up display device 10 includes a case 20 accommodating therein a projector 12 which projects light for displaying an image, a control board 13 which controls the projector 12, a composite body 30 which reflects light projected from the projector 12, detects light from the outside, and blocks the light from the outside, and a concave mirror 24 which reflects light reflected from the composite body 30 toward the windshield 11 (screen 11), and a lid body 40 covering an upper part of the case.

The case 20 is made of synthetic resin, and is constituted of a first case half 21, and a second case half 22 supported by the first case half 21. The second case half 22 is supported as an upper edge portion 22a and a lower edge portion 22b are engaged with the first case half 21.

In the second case half 22, the projector 12 is provided. The projector 12 is structured in such a way that a light source substrate 16 on which a light source 15 is mounted, a lens 17, and a display panel 18, for example, are accommodated in a projector case 14. An opening 40a is formed in the lid body 40 placed over the first case half 21, and a translucent cover 41 which allows transmission of light is attached to the opening 40a. The composite body 30 is supported by the first case half 21.

Figure 2:
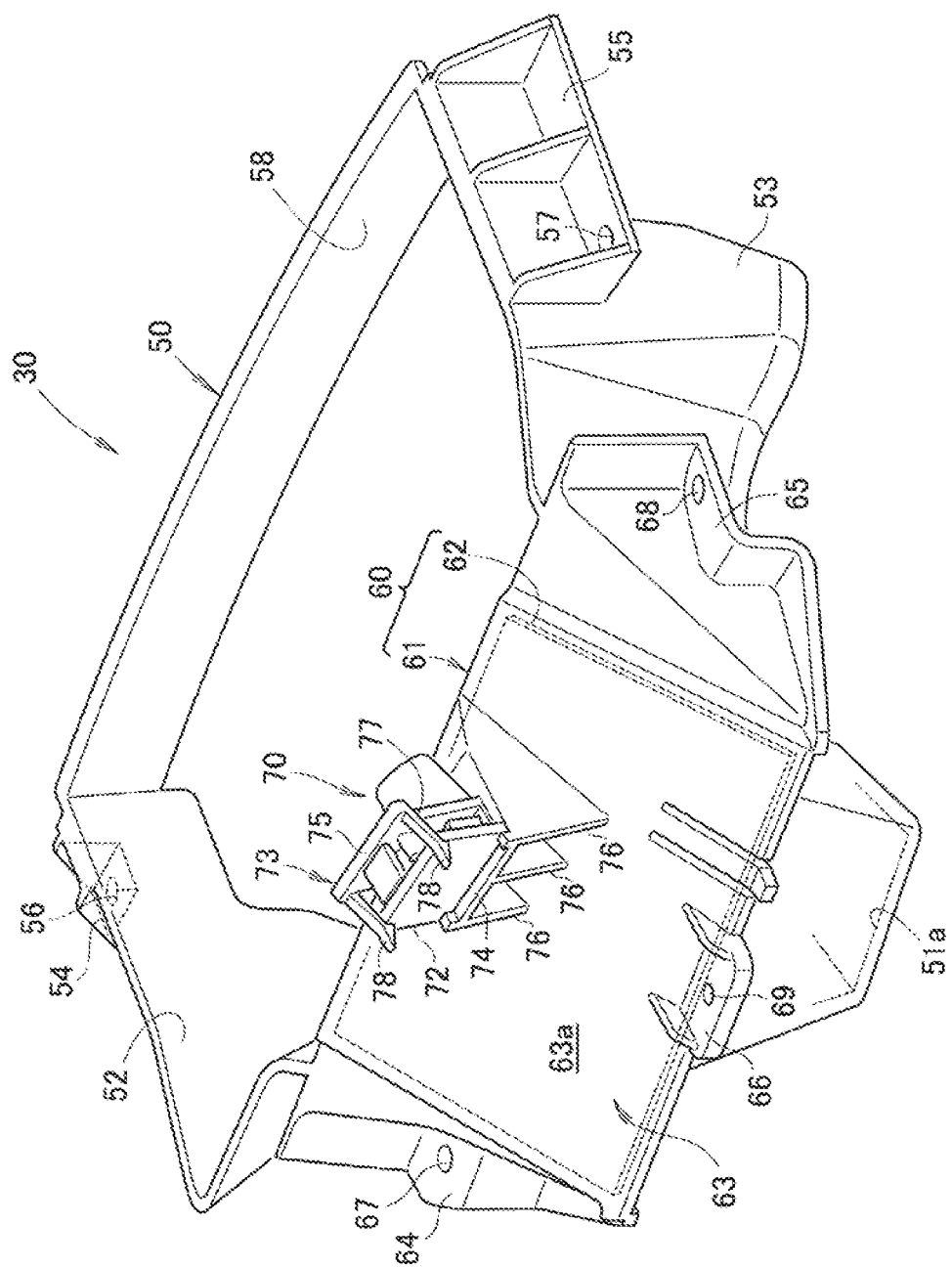
FIG. 2 is a perspective view of a composite body of the head-up display device shown in FIG. 1.

Next, the composite body 30 will be described. FIGS. 1 and 2 are referred to.

The composite body 30 is constituted of a light-shielding portion 50 (light-shielding body 50) which prevents external light from entering the projector 12 and the control board 13, a reflection unit 60 which reflects light projected from the projector 12, and a light-receiving unit 70 which detects the external light.

Note that apart from the light-shielding portion 50 in the composite body 30 accommodated in the case 20, a light-shielding wall 42 which prevents the external light from entering the reflection unit 60 is formed in the lid body 40. In the light-shielding wall 42, a light intake hole 43 for taking in part of the external light is formed.

The light-shielding portion 50 is constituted of a bottom portion 51, a left wall portion 52 extending upward from a left end of the bottom portion 51, a right wall portion 53 extending upward from a right end of the bottom portion 51, and a front wall portion 58 spanning between the left wall portion 52 and the right wall portion 53.

In a rear part of the bottom portion 51, a first opening portion 51a through which the light projected from the projector 12 passes is formed. In a front part of the bottom portion 51, a second opening portion 51b accommodating the concave mirror 24 therein is formed.

A first contact portion 54 having a flat shape extending to the left is formed on the left wall portion 52. A second contact portion 55 having a flat shape extending to the right is formed on the right wall portion 53. A first hole 56 is formed in the first contact portion 54. A second hole 57 is formed in the second contact portion 55.

The reflection unit 60 is configured to hold a flat mirror 62 (reflecting mirror 62) by a mirror holder 61 (holder 61). The flat mirror 62 is formed of, for example, a base made of synthetic resin, and a reflection film formed on the base by vapor deposition. The flat mirror 62 is attached to the mirror holder 61 by a double-sided tape, for example. Alternatively, a structure in which an edge of the flat mirror 62 is engaged with the mirror holder 62 may be employed.

The mirror holder 61 is constituted of a flat portion 63 to which the flat mirror 62 is attached, a third contact portion 64 which is provided on the left side of the flat portion 63 and has a stepped shape, a fourth contact portion 65 which is provided on the right side of the flat portion 63 and has a stepped shape, and a fifth contact portion 66 of a flat shape provided at a bottom of the flat portion 63.

A third hole 67 to a fifth hole 69 are formed in the third contact portion 64 to the fifth contact portion 66, respectively.

When the composite body 30 is fit to the first case half 21, the first contact portion 54 to the fifth contact portion 66 contact the first case half 21. The first hole 56 to the fifth hole 69 can be used as screw holes for positioning or fixing of the composite body 30 to the first case half 21. A detailed description of a method of fitting and fixing the composite body 30 to the first case is omitted.

The light-receiving unit 70 is constituted of a sensor substrate 72 on which a light-receiving sensor 71 is mounted, and a substrate holding portion 73 (sensor holding portion 73) which holds the sensor substrate 72. As the light-receiving sensor 71, a photodiode, for example, is adopted.

The sensor substrate 72 is connected to the control board 13 via a wiring member 79 (connecting member 79). The light-receiving sensor 71 detects illuminance of the external light that has passed through the light intake hole 43, and outputs a result of the detection to the control board 13. The control board 13 adjusts the illuminance of the light source 15.

The substrate holding portion 73 is constituted of a base portion 74, and a pinching portion 75 which is formed above the base portion 74 and pinches the sensor substrate 72.

A tubular cylindrical portion 77 surrounding the light-receiving sensor 71 is formed on a front surface of the pinching portion 75. An inner diameter of the cylindrical portion 77 is smaller than a diameter of the light intake hole 44. On a rear surface of the pinching portion 75, two engagement claws 78 are formed. The sensor substrate 72 is sandwiched between the engagement claws 78 and the base portion 74. Three ribs 76 are formed between the base portion 74 and a back surface 63a, which is a surface opposite a surface to which the flat mirror 62 is attached.

The substrate holding portion 73 is located on the side of the back surface 63a of the flat portion 63, and also above the flat portion 63 (see FIG. 1). However, the substrate holding portion 73 may be provided at an appropriate part of the mirror holder 61, as long as the substrate holding portion 73 to be provided does not obstruct incidence and reflection of light by the flat mirror 62.

The light-shielding portion 50, the mirror holder 61, and the substrate holding portion 73 are integrally formed by synthetic resin. Alternatively, only the light-shielding portion 50 and the mirror holder 61 may be formed integrally, or only the mirror holder 61 and the substrate holding portion 73 may be formed integrally.

Next, advantages of the present invention will be described.

Figure 3:
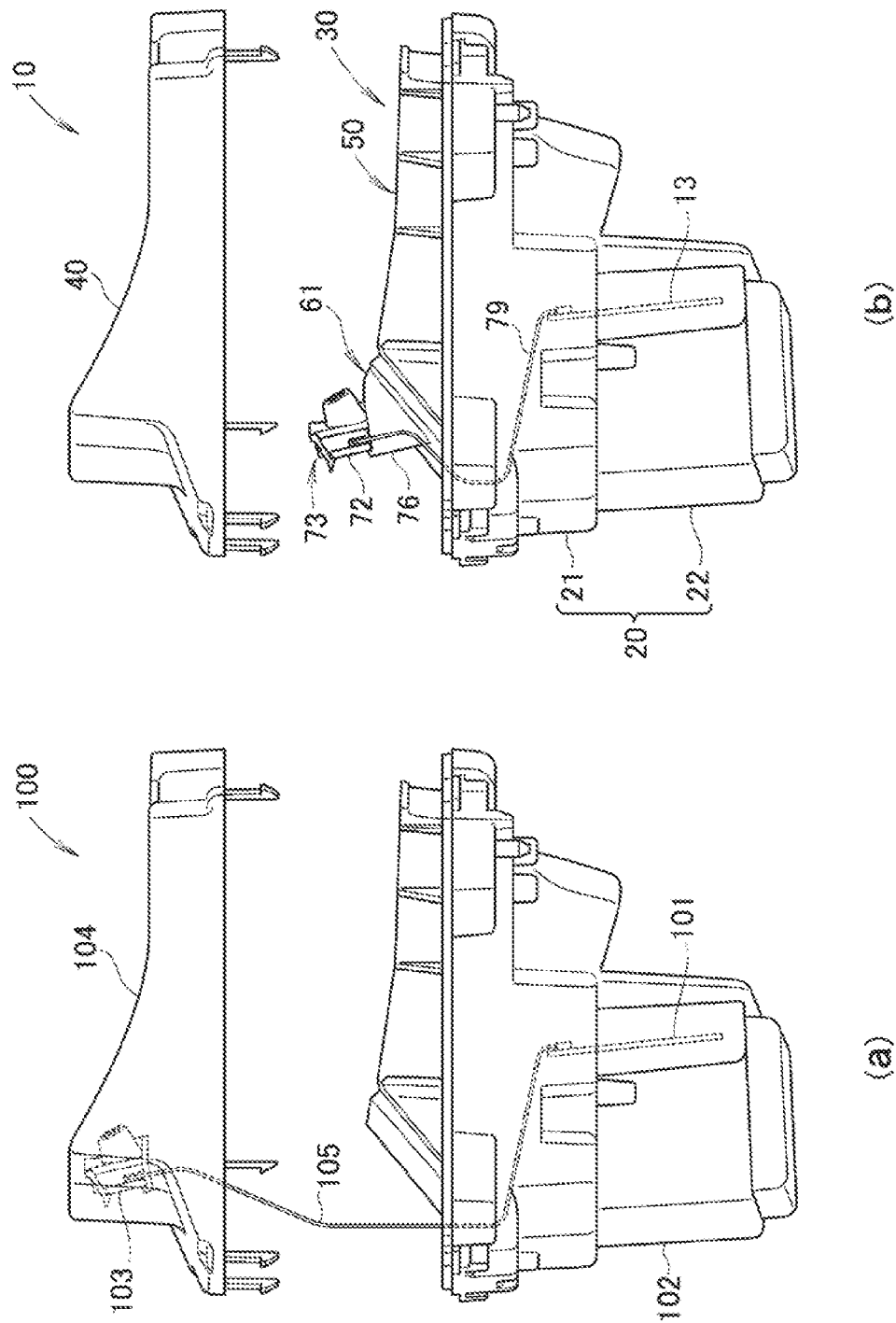
FIG. 3 is a view of the effect of the head-up display device shown in FIG. 1.

FIG. 3A is referred to. A head-up display device 100 shown in FIG. 3A is a head-up display device according to a comparative example. If a control board 101 is attached to a case 102, and a substrate holding portion 103 is attached to a lid body 104, the lid body 104 is connected to the case 102 by a wiring member 105. Accordingly, a range in which the lid body 104 can be moved is restricted.

FIG. 3B is referred to. The head-up display device 10 shown in FIG. 3B is the head-up display device according to the embodiment. In the present embodiment, the substrate holding portion 73 which holds the sensor substrate 72 is held by the mirror holder 61. The mirror holder 61 and the control board 13 are both accommodated in the case 20, and the control board 13 and the sensor substrate 72 are connected by the wiring member 79. Thus, the wiring member 79 is accommodated in the case 20, and is not connected to the lid body 40. As a result, when the lid body 40 is fit to the case 20, movement of the lid body 40 is not restricted by the wiring member 79. Fitting of the lid body 40 is facilitated.

FIG. 2 is referred to. In addition to the above, the ribs 76 are formed between the base portion 74 of the substrate holding portion 73 and the back surface 63a of the flat portion 63. Consequently, the ribs 76 reinforcing the substrate holding portion 73 can also increase the surface rigidity of the flat portion 63. Since the surface on which the flat mirror 62 is attached is less likely to be deflected, mounting of the flat mirror 62 is facilitated.

In addition, the cylindrical portion 77 which surrounds the light-receiving sensor 71 cylindrically is provided on the substrate holding portion 73. The light-receiving sensor 71 is protected by the cylindrical portion 77. Given that the substrate holding portion 73 is provided on the mirror holder 61, and the cylindrical portion 77 is provided on the lid body 40, in a state where the lid body 40 is placed over the case 20, there is a possibility that the center of the light-receiving sensor 71 provided on the side of the case 20 will be deviated from the center of the cylindrical portion 77 provided on the side of the lid body 40 due to a dimension error of the components. If the centers of the two are deviated from each other, the detection accuracy of the light-receiving sensor 71 may be lowered. Meanwhile, when the cylindrical portion 77 is provided on the substrate holding portion 73, in other words, when the substrate holding portion 73 and the cylindrical portion 77 are both provided on the side of the case 20, there is no fear of deviation between the center of the cylindrical portion 77 and the center of the light-receiving sensor 71. Therefore, the detection accuracy of the light-receiving sensor 71 can be maintained.

FIG. 2 is referred to. Furthermore, the light-shielding portion 50, the mirror holder 61, and the substrate holding portion 73 are integrally formed. As compared to a case where respective parts are separately formed and fixed to each other, screws are not required, and the number of components constituting the head-up display device 10 can be reduced.

Alternatively, only the light-shielding portion 50 and the mirror holder 61 may be integrally formed, and the substrate holding portion 73 may be formed separately. For example, an angle of the light-receiving sensor 71 can be adjusted according to the type of vehicle in which the head-up display device 10 is mounted.

The head-up display device 10 according to the present invention has been explained by taking a vehicle as an example. However, the head-up display device 10 of the present invention is applicable to other conveyances, and no limitation is imposed on the types of conveyances. Further, the screen is not limited to a windshield, and may be a combiner supported by the case. In other words, the present invention is not limited to the embodiment described as long as the effect and advantages of the present invention can be brought about.

INDUSTRIAL APPLICABILITY

The head-up display device of the present invention is suitable to be mounted in a passenger vehicle.

DESCRIPTION OF REFERENCE NUMERALS

10 Head-up display
12 Projector
13 Control board
20 Case
21 First case half
30 Composite body
50 Light-shielding portion
60 Reflection unit
61 Mirror holder
62 Flat mirror
63 Flat portion
63a Back surface
70 Light-receiving unit
71 Light-receiving sensor
72 Sensor substrate
73 Substrate holding portion
74 Base portion
75 Pinching portion
76 Rib
77 Cylindrical portion
79 Wiring member

The invention claimed is:
1. A head-up display device comprising:
a case accommodating therein:
- a projector which projects light for displaying an image;
- a control board which controls the projector;
- a reflecting mirror that reflects the light projected from the projector; and
- a holder to which the reflecting mirror attached;

a lid body detachably attached to an upper part of the case to cover the upper part of the case, the lid body comprising:
- an opening that allows the light projected from the projector to be emitted outside the head-up display device; and
- a light-shielding wall that prevents external light from entering the reflecting mirror from outside the head-up display device through the opening, the light-shielding wall comprising a light intake hole that allows part of the external light to pass through, wherein the case further accommodates therein:
- a light-receiving sensor that detects the external light that passed through the light intake hole; and
- a sensor holding portion to which the light-receiving sensor is attached, wherein the light-receiving sensor is connected to the control board accommodated in the case via a connecting member,
wherein the holder protrudes from an inner wall of the case and has a first surface and a second surface directly behind and on a rear surface of the first surface,
wherein the reflecting mirror is directly attached onto the first surface of the protruding holder while the sensor holding portion is directly attached onto the second surface of the protruding holder such that the sensor holding portion protrudes from the second surface of the protruding holder to arrange the protruding holder between the sensor holding portion and the reflecting mirror, and
wherein the sensor holding portion along with the light-receiving sensor continues to be attached onto the second surface of the protruding holder even when the lid body including the light-shielding wall is detached from the upper part of the case.

2. The head-up display device according to claim 1,
wherein the sensor holding portion is provided with a cylindrical portion that surrounds the light-receiving sensor cylindrically,
wherein the cylindrical portion faces the light intake hole, and
wherein an inner diameter of the cylindrical portion is smaller than a diameter of the light intake hole.

3. The head-up display device according to claim 1,
wherein the case further accommodates therein:
- a concave mirror that reflects the light reflected from the reflecting mirror; and
- a light-shielding body that extends from the reflecting mirror toward the concave mirror, wherein a front surface of the light-shielding body faces the reflecting mirror, the concave mirror, and the opening, and
wherein a back surface of the light-shielding body faces the control board.

4. The head-up display device according to claim 1, wherein the protruding holder is arranged between the sensor holding portion and the reflecting mirror without a part of the case intervening between the protruding holder and the sensor holding portion and between the protruding holder and the reflecting mirror.

5. The head-up display device according to claim 1, wherein the sensor holding portion is formed integrally with the holder.

6. The head-up display device according to claim 5, further comprising a light-shielding body which blocks light from outside, wherein the holder is formed integrally with the light-shielding body.

* * * * *

UNITED STATES PATENT AND TRADEMARK OFFICE
CERTIFICATE OF CORRECTION

PATENT NO. : 11,226,484 B2
APPLICATION NO. : 16/340989
DATED : January 18, 2022
INVENTOR(S) : Satoshi Tsuchiya et al.

It is certified that error appears in the above-identified patent and that said Letters Patent is hereby corrected as shown below:

On the Title Page

Item [30], insert:
-- Oct. 26, 2016 (JP)...................... 2016-209790 --

Signed and Sealed this
Seventeenth Day of May, 2022

Katherine Kelly Vidal
*Director of the United States Patent and Trademark Office*